May 26, 1959   V. H. HILDEBRANT   2,888,057
PNEUMATIC TIRE CASING WITH TRACTION INCREASING MEANS
Filed Dec. 13, 1956

INVENTOR.
VERNON H. HILDEBRANT
BY
J. Warren Kinney, Jr.
ATTORNEY

United States Patent Office 2,888,057
Patented May 26, 1959

2,888,057

PNEUMATIC TIRE CASING WITH TRACTION INCREASING MEANS

Vernon H. Hildebrant, Morrow, Ohio

Application December 13, 1956, Serial No. 628,135

2 Claims. (Cl. 152—210)

This invention relates to pneumatic tires, and more particularly to pneumatic tires having an integral anti-skid or traction increasing device associated therewith.

An object of the invention is to provide a pneumatic tire casing including anti-skid means which are adapted to be selectively disposed in contacting or non-contacting relationship with the ground or other supporting surface.

Another object of the invention is to provide a pneumatic tire casing with outwardly projecting spike-like elements which are normally located above and out of contacting relationship with the ground or other wheel supporting surface when the casing is fully inflated and which are disposed in contacting relationship with the ground when the casing is only partly inflated, for enabling a driver to obtain positive traction means for driving on ice by merely partially deflating his tires.

A further object of the invention is to teach a method of fabricating tire casings having the hereinabove described anti-friction means.

Still a further object of the invention is to teach a method of using a tire for driving on ice.

These and other objects are attained by the means described herein and as disclosed in the accompanying drawings in which.

Figures 1, 1A:
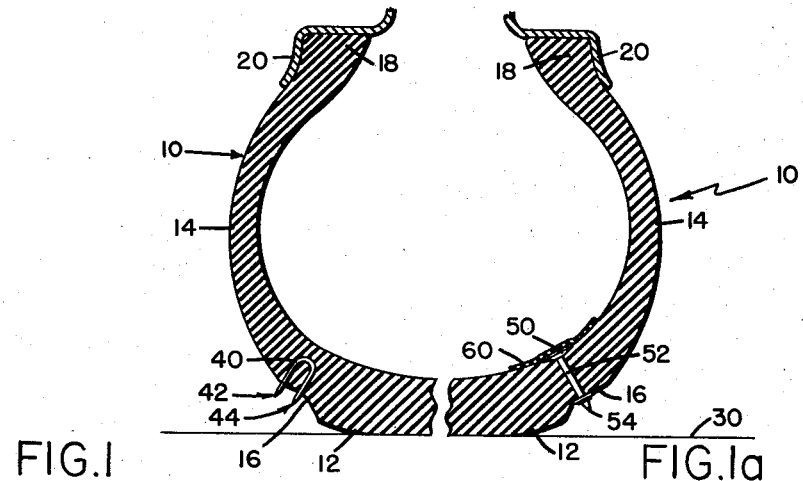
Fig. 1 is a sectional view illustrating a fully inflated pneumatic tire casing embodying one modification of the present invention.
Fig. 1a is a sectional view illustrating a pneumatic tire casing according to another embodiment of the invention.

With particular reference to Fig. 1 of the drawings, the numeral 10 denotes generally a typical pneumatic tire casing which includes a tread portion 12, a side wall portion 14, an intermediate shoulder portion 16 and a bead portion 18 which is adapted to engage complementary portions of a rim 20 for mounting the tire circumferentially of a wheel of which rim 20 may comprise an integral part.

Although I have illustrated the invention in conjunction with a so-called tubeless type of pneumatic tire casing, it should be fully understood that such representation is exemplary rather than restrictive in nature, since the invention is capable of being practiced with equal facility using tire casings which utilize inner tubes.

With reference again to Fig. 1 of the drawings, it will be noted that when the casing is fully inflated, as illustrated, the intermediate portions 16 and side wall portions 14 are located a considerable distance above, being spaced from and out of contacting relationship with a supporting surface denoted generally by the numeral 30.

In other words, only the tread portion 12 normally contacts supporting surface 30 during those periods of time when the casing is fully inflated.

If desired, tread 12 may comprise any conventional tread pattern, including special treads which are particularly adapted to impart traction to a tire when driven on or through snow.

Figures 4, 4A:
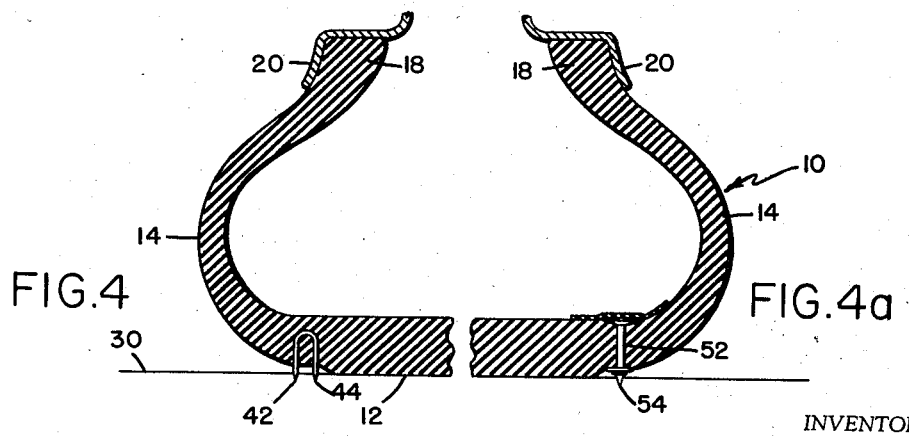
Fig. 4 is a view of the device shown in Fig. 1, illustrating the casing in a partially inflated condition.
Fig. 4a is a sectional view of the device shown in Fig. 1a illustrating the casing in a partially inflated condition.

With reference now to Fig. 1, the numeral 40 denotes generally a substantially U-shaped steel wire, hereinafter referred to as an anti-skid member or device which is imbedded in and therefore comprises an integral part of the tire casing. The ends 42 and 44 of the anti-skid device project outwardly from and beyond the outer surface of intermediate portion 16 of the tire casing, substantially as illustrated, so that during those periods of time when the casing is fully inflated ends 42 and 44 of the anti-skid means 40 will be located an appreciable distance above supporting surface 30. However, as illustrated in Fig. 4, ends 42 and 44 will be automatically lowered into contacting relationship with supporting surface 30 when the casing is but partially inflated, whereby the projecting portions 42 and 44 will bite into supporting surface 30 for providing positive traction therewith, particularly in those instances wherein supporting surface 30 may be covered with ice.

Figures 2, 3:
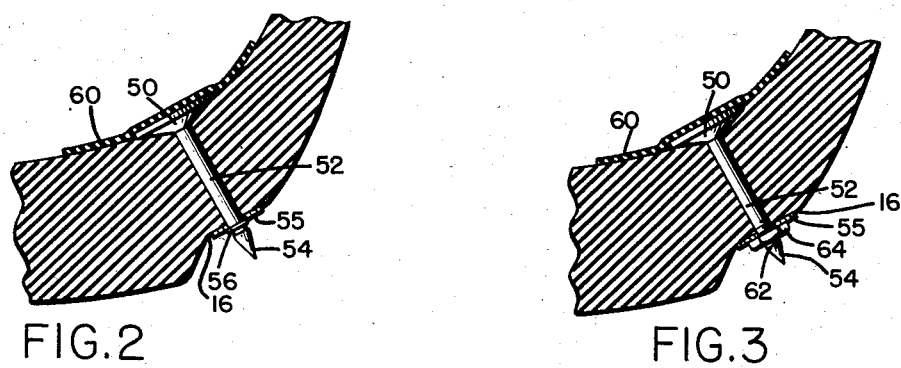
Fig. 2 is an enlarged sectional view of a detail of construction of the device of Fig. 1.
Fig. 3 is a view similar to Fig. 2, but showing a modified type of construction.

With particular reference now to Fig. 1a, it will be noted that the anti-skid device comprises a tack-like element which includes an enlarged inner, headed portion 50 and a shank portion 52 the outer end of which terminates in a sharpened tip 54. With reference now to Figs. 2 and 3, it will be noted that head 50 may be tightly compressed onto the inner surface of the tire casing such as by means of a washer 55, which circumscribingly engages shaft 52 and abuts against a portion of intermediate face 16, said washer being anchored onto the shaft by means of an upset collar 56 formed integral with shaft 52.

If desired, sealing means 60 may be secured over the inner face of head 50 for providing an air-tight seal between the head and the interior of the tire casing, however in certain instances this sealing means may be dispensed with, or a seal provided between the head and casing.

In Fig. 3 I have illustrated a modified construction wherein the outer end of shaft 52 has been externally threaded as at 62 to receive a nut 64 which when threaded onto shaft 52 will place it in tension for tightly drawing head 50 and washer 55 into firm, positive engagement with respective faces of the tire casing.

By comparing Fig. 1a with Fig. 4a, it will be noted that the anti-skid device just described is likewise adapted to be located in an elevated position above and out of contact with a supporting surface 30 during those periods of time when the tire casing is fully inflated, however said means will be lowered into support-surface-engaging position when the casing is but partially deflated.

The present invention is not directed to nor limited by any particular type of anti-skid means which are carried by and project outwardly from the intermediate portion of a tire casing.

The anti-skid device illustrated in Figs. 1 and 4 represents generally any type of anti-skid means which would be built into the tire casing at the time of manufacture for the purposes of this invention; wherefore, its should be understood that the particular construction and shape of such means may be varied considerably— just so long as the completed casing includes a plurality of circumferentially spaced anti-skid elements disposed generally as in Fig. 1.

The anti-skid device of Figs. 1a and 4a represents generally any type of anti-skid means which extend entirely through the casing and which may be associated therewith either by the manufacture thereof—or by the owner or user of the tires. The anti-skid means illustrated are merely representative and are not intended to limit the various shapes and sizes which could be used in practicing the invention.

As earlier indicated, the anti-skid means are disposed in spaced relationship entirely around the circumference of the tire casing at a location above the tread portion, as illustrated.

In use the casing is operated as any conventional tire when fully inflated; however, when it becomes necessary to obtain the benefit of the anti-skid means all the driver need do is let some air out of the tire until the anti-skid means will be lowered so as to engage the surface of the roadway. The tire may be driven indefinitely in the partly inflated condition of Fig. 4. When the anti-skid or traction increasing characteristics of the devices are no longer required, they may be quickly and efficiently rendered inoperative by inflating the tire as in Fig. 1.

From the foregoing, it will be noted that I have thus provided a tire casing with anti-skid or traction increasing means which may be selectively disposed in inoperative or operative position by controlling the inflation of the casing.

It should be understood that various changes and modifications may be made in the structural details of the device within the scope of the appended claims without departing from the spirit of the invention.

What is claimed is:

1. A pneumatic tire casing including a tread portion to contact a roadway, a flexible side wall, and a shoulder portion at the juncture of the tread portion and the side wall, said shoulder portion being spaced from the roadway when the casing is inflated, and auxiliary traction means rendered operative by partial deflation of the casing to lower the shoulder portion toward the roadway, said traction means comprising a rigid pin having an inner enlarged head applying pressure against the inner face of the tire casing, and an outer exposed end projecting through the casing from the shoulder portion exteriorly thereof, the exposed end of the pin being extended a distance such as to clear the roadway when the tire casing is fully inflated, and to contact the roadway when the casing is partly deflated, a washer-like element being mounted on the exposed end of the pin, said washer-like element engaging and applying pressure against the outer face of the casing for holding the inner enlarged head of the pin in firm contact against the inner face of the tire casing.

2. The apparatus as defined in claim 1, wherein said washer-like element is slidably mounted on said pin, said exposed end of the pin being threaded, and an adjusting member threaded on said exposed end for engaging said washer-like element to adjust the tension on the pin for tightly drawing the head of the pin and the washer-like element into firm positive engagement with the respective faces of the tire casing.

References Cited in the file of this patent

UNITED STATES PATENTS

| | | |
|---|---|---|
| 1,019,973 | Lieb | Mar. 12, 1912 |
| 2,235,375 | Kraft | Mar. 18, 1941 |
| 2,354,715 | Tarbox | Aug. 1, 1944 |